US006778843B2

(12) United States Patent
Oura

(10) Patent No.: US 6,778,843 B2
(45) Date of Patent: Aug. 17, 2004

(54) ARRAY ANTENNA TRANSCEIVER CAPABLE OF CONTINUING TRANSMISSION AND RECEPTION REGARDLESS OF FAILURE OF REFERENCE SIGNAL

(75) Inventor: Satoshi Oura, Tokyo (JP)

(73) Assignee: NEC Corporation, Tokyo (JP)

( * ) Notice: Subject to any disclaimer, the term of this patent is extended or adjusted under 35 U.S.C. 154(b) by 646 days.

(21) Appl. No.: 09/855,658

(22) Filed: May 16, 2001

(65) Prior Publication Data

US 2001/0046844 A1 Nov. 29, 2001

(30) Foreign Application Priority Data

May 17, 2000 (JP) ........................................ 2000-145129

(51) Int. Cl.[7] ................................................ H04B 1/38
(52) U.S. Cl. .................... 455/561; 455/562.1; 455/255; 455/447
(58) Field of Search .............................. 455/560, 562.1, 455/561, 447, 20, 255, 259, 133; 370/335; 342/368

(56) References Cited

U.S. PATENT DOCUMENTS

| | | | | |
|---|---|---|---|---|
| 6,005,854 | A | * 12/1999 | Xu et al. | 370/335 |
| 6,356,771 | B1 | * 3/2002 | Dent | 455/562.1 |
| 6,405,018 | B1 | * 6/2002 | Reudink et al. | 455/20 |
| 6,415,162 | B1 | * 7/2002 | Dent | 455/562.1 |
| 6,496,142 | B1 | * 12/2002 | Iinuma | 342/368 |
| 6,553,234 | B1 | * 4/2003 | Florea | 455/447 |
| 2002/0077068 | A1 | * 6/2002 | Dent | 455/561 |

FOREIGN PATENT DOCUMENTS

| | | |
|---|---|---|
| JP | 5-191128 | 7/1993 |
| JP | 5-281326 | 10/1993 |
| JP | 7-154129 | 6/1995 |
| JP | 8-172312 | 7/1996 |
| JP | 10-79619 | 3/1998 |
| WO | WO00/26988 | 5/2000 |

\* cited by examiner

*Primary Examiner*—Quochien B. Vuong
*Assistant Examiner*—Lana Le
(74) *Attorney, Agent, or Firm*—Foley & Lardner LLP

(57) ABSTRACT

An array antenna transceiver includes an antenna section, N transceiver blocks, a common reference signal generating section and a transceiver control section. The antenna section has antenna elements. The N transceiver blocks are connected to the antenna elements. Each of the N transceiver blocks generates an individual reference signal. The transceiver block carries out transmission of a transmission signal and reception of a reception signal based on an common reference signal using a corresponding antenna element as a part of an array antenna in an array mode and based on said individual reference signal using the corresponding antenna element as an individual antenna element in an individual mode. The common reference signal generating section supplies the common reference signal to the N transceiver blocks. The transceiver control section sets said array mode when said common reference signal is used, and said individual mode when said individual reference signal is used.

11 Claims, 2 Drawing Sheets

ARRAY ANTENNA TRANSCEIVER CAPABLE OF CONTINUING TRANSMISSION AND RECEPTION REGARDLESS OF FAILURE OF REFERENCE SIGNAL

BACKGROUND OF THE INVENTION

1. Field of the Invention

The present invention relates to an array antenna transceiver, and more particularly to an array antenna transceiver in which transmission and reception can be continued even when a reference signal supply system is failed.

2. Description of the Related Art

An array antenna transceiver has a transceiver section provided for every antenna element and a transceiver section control circuit which controls them. In case of reception, the array antenna transceiver carries out a process for frequency conversion to a signal received by each antenna element in the transceiver section and sends to the transceiver section control circuit, which carries out a weighting operation and a synthesizing operation. In case of transmission, a signal is subjected to a weighting operation in the transceiver section control circuit and is sent to the transceiver section, which carries out a transmission process for frequency conversion and transmits from each antenna element.

FIG. 1 is a block diagram of a conventional array antenna transceiver. Referring to FIG. 1, the conventional array antenna transceiver is composed of an antenna section 201, N transceiver sections 202-1 to 202-N, N reference signals 203-1 to 203-N, a transceiver section control circuit 204, a hybrid 205, and a common reference signal generating section 206. Generally, the transceiver sections are provided for inputs and outputs of the antenna sections, and the N transceiver sections are provided in this conventional example. To supply a reference signal, a synchronization signal is supplied to the common reference signal generating section 206, which generates a reference signal. The generated reference signal is distributed to the N transceiver sections 202-1 to 202-N by the hybrid 205. Through this method, the reference signal is generated by the common reference signal generating section 206 and supplied to all the transceiver sections. Therefore, the reference signals can be supplied to all the transceiver sections from a single signal source in common.

In the conventional array antenna transceiver shown in FIG. 1, the common reference signal generating section is provided outside of the respective transceiver sections as a reference signal source, and the output thereof is distributed to the respective transceiver sections. Thus, synchronization between the transceiver sections can be established. The reason why the synchronization is established between the transceiver sections in this way is that the weighting operation and synthesizing operation to a transmission or reception signal cannot be carried out with high precision, unless the transceiver sections for the number of antenna elements are not synchronous with each other in the array antenna transceiver.

On the other hand, the method of generating a reference signal individually for every transceiver section without using the common reference signal generating section could be thought of. However, in such a case, there is possibility that the reference signals different in phase, amplitude and frequency are supplied to the respective transceiver sections. Therefore, to establish synchronization between the transceiver sections, calibration would have to be separately carried out.

For the above reason, in the conventional array antenna transceiver, the signal common to all the transceiver sections is supplied from the common reference signal generating section. In this way, it is possible to carry out the weighting operation and the synthesizing operation to the transmission and reception signals in the high precision without carrying out any calibration.

However, in the above-mentioned conventional array antenna transceiver, the signal transmission and reception cannot be carried out in all the transceiver blocks when the common reference signal generating section is set to a non-operating state because of a kind of trouble.

In conjunction with an array antenna forming method is disclosed in Japanese Laid Open Patent Application (JP-A-Heisei 5-191128). In this reference, a unit reception system is formed of unit receiving blocks 1-1 to 1-N, phase synchronizing blocks 2-1 to N-1 and phase reference block 3, and the unit receiving block is composed of a reception antenna 7 and a reception converter 8. A local signal frequency for the reception converter 8 is locked to a predetermined frequency based on the external reference signal. The external reference signal is supplied into the converter through an output terminal of the reception converter 8. By using the reference signal as a common reference signal to the respective reception converters 8, the local signal frequencies of the converters are made common without local distribution in a high frequency band. In this way, all the reception converters can be made operated in common even if the number of elements of an adaptive array antenna is many.

Also, an antenna apparatus is disclosed in Japanese Laid Open Patent Application (JP-A-Heisei 5-281326). In this reference, the antenna apparatus is composed of a first antenna row which is composed of at least two antennas which are arranged in a horizontal direction orthogonal to a radio wave arrival direction and a radio wave facing plane which is perpendicular to the radio wave arrival direction. A drive section drives the first antenna row to an azimuth direction. A phase difference detecting section detects the phase difference between the reception signals of the antennas of the first antenna row. A drive control section controls the drive section to drive the first antenna row by means in the direction in which the phase difference detected by the phase difference detecting section is zero. A second antenna row is composed of a plurality of antennas arranged in a vertical direction orthogonal to the horizontal direction in parallel to each other. A drive section drives the second antenna row in an azimuth direction. A drive control section controls to the drive section to drive the second antenna row into the substantially same direction as the directing direction of the first antenna row. A reference signal generation section generates a reference signal from the reception signal of at least one of the antennas in the first and second antenna rows. A signal control section generates a comparison signal from the reception signal of at least one of the other antennas and converts the frequency of the comparison signal such that the frequency of the comparison signal is coincident with that of the reference signal, and controls the phase of the comparison signal such that the phase of the comparison signal is coincident with the phase of the reference signal. A synthesizing section synthesizes the reference signal and the comparison signal controlled by the signal control section.

Also, an adaptive array antenna apparatus of an LMS (least mean square) system is disclosed in Japanese Laid Open Patent Application (JP-A-Heisei 7-154129). In this reference, the adaptive array antenna apparatus is composed of a plurality of antennas and multiplying sections. The multiplying sections multiply weighting coefficients individually to radio wave signals received by said a plurality of antennas, respectively. An adding section adds the respective output signals of the multiplying section to produce an output signal of the antenna apparatus. An extracting section extracts a pilot signal indicating predetermined contents from the output signal of the adding section. A reference signal generating section compensates the output signal of the adding section based on the pilot signal extracted by the extracting section to generate a reference signal. A subtracting section calculates a signal indicative of the difference between the output signal of the adding section and the reference signal. A control section controls each weighting coefficient of the multiplying section to minimize the difference signal. A pattern signal is subjected to time division Multiplexing with a data signal and contained for every predetermined interval in the radio wave signal. The extracting section extracts the pilot signal subjected to the time division multiplexing.

Also, a mobile terminal reception antenna system is disclosed in Japanese Laid Open Patent Application (JP-A-Heisei 8-172312). In this reference, an array antenna is composed of at least two antenna units. First frequency converters are provided for the antenna units and convert reception signals received by the antenna units into first intermediate frequency signals in frequency. A first common local oscillator supplies a first local oscillation signal to the first frequency converters in common. A plurality of second frequency converters convert the first intermediate frequency signals into second intermediate frequency signals, respectively. A synthesizing unit in-phase synthesizes the plurality of second intermediate frequency signals outputted from the plurality of second frequency converters to generate a reception signal. First and second mono-pulse circuits carry out frequency conversion to the first intermediate frequency signal outputted from two of the first frequency converters which correspond to the antenna units provided on the left side and the right of the antenna units. A phase detecting section detects the phase difference of the output of the first mono-pulse circuit and the output of the second mono-pulse circuit. A turning section turns the array antenna in the horizontal plane based on the output of the phase detecting section. A specific frequency converter as one of the plurality of second frequency converters outputs a reference signal. A second local PLL oscillator supplies a second local oscillation signal to the first and second mono-pulse circuits in common. A control section is provided for each of the plurality of second frequency converters other than the specific frequency converter to control such that a second intermediate frequency signal in phase to the reference signal is outputted. The turn section turns the antenna units for the azimuth of the array antenna to be coincident with the direction of the arrival of the radio wave.

Also, an array antenna apparatus is disclosed in Japanese Laid Open Patent Application (JP-A-Heisei 10-79619). In this reference, the array antenna apparatus is composed of a plurality of antenna elements and a reference signal generating unit. Weighting sections carry out complex weighting operations to the outputs of the antenna elements, respectively. A branching unit outputs the outputs of the antenna elements to the weighting section and weighting control section. A synthesizing section synthesizes the signals after the complex weighting operation. The antenna element outputs determined based on a delay time distribution of incoming wave are controlled.

SUMMARY OF THE INVENTION

An object of the present invention is to provide an array antenna transceiver in which transmission and reception can be carried out even if a common reference signal generating section has stopped operation due to a kind of trouble such as a failure, or a tranceiver block cannot detect the input of a reference signal from a common reference signal generating section.

In an aspect of the present invention, an array antenna transceiver includes an antenna section, N transceiver blocks, a common reference signal generating section and a transceiver control section. The antenna section has antenna elements. The N (N is an integer more than 1) transceiver blocks are connected to the antenna elements. Each of the N transceiver blocks generates an individual reference signal. The transceiver block carries out transmission of a transmission signal and reception of a reception signal based on an common reference signal using a corresponding antenna element as a part of an array antenna in an array mode and based on said individual reference signal using the corresponding antenna element as an individual antenna element in an individual mode. The common reference signal generating section supplies the common reference signal to the N transceiver blocks. The transceiver control section sets said array mode when said common reference signal is used, and said individual mode when said individual synchronization signal is used.

Each of the N transceiver blocks may include an individual reference signal generating section which generates the individual reference signal.

Also, each of the N transceiver blocks may include a transceiver section, a switch, and a switching control circuit. The transceiver section carries out the transmission of the transmission signal and the reception of the reception signal using the corresponding antenna element as the part of the array antenna in the array mode based on the common reference signal and using the corresponding antenna element as the individual antenna element in the individual mode based on the individual reference signal. The switching control circuit controls the switch to supply the common reference signal to the transceiver section, when the common reference signal is supplied to the transceiver block. Also, the switching control circuit controls the switch to supply the individual reference signal to the transceiver section, when the common reference signal is not supplied to the transceiver block.

In this case, each of the N transceiver blocks may include a detecting circuit which determines whether the common reference signal is supplied to the transceiver block.

Also, the switching control circuit may control the switch to supply the common reference signal to the transceiver section, when the common reference signal is supplied to the transceiver block. Also, the switching control circuit may control the switch to supply the individual reference signal to the transceiver section, when the common reference signal is not supplied to the transceiver block or when the common reference signal generating section is not in an operation state.

Also, the array antenna transceiver may further include an alarm detecting circuit which determines whether or not the common reference signal generating section is in the operation state.

In another aspect of the present invention, a method of ensuring continuity of transmission and reception in an array antenna transceiver, is attained by (a) generating a common reference signal normally by a common reference signal generating circuit; by (b) generating an individual reference signal; by (c) setting each of N transceiver blocks connected to antenna elements to one of an array mode and an individual mode based on whether the common reference signal is available; by (d) carrying out one of an array mode process and an individual mode process to a transmission signal and a reception signal to and from each of the N transceiver blocks based on whether the transceiver block is set to the array mode or the individual mode; and by (e) carrying out transmission of the transmission signal and reception of the reception signal using the corresponding antenna element as a part of an array antenna in the array mode and using the corresponding antenna element as an individual antenna element in the individual mode.

In the (c) setting step, each of N transceiver blocks may be set to the array mode when the common reference signal is available, and to the individual mode when the common reference signal is not available.

Also, the (e) carrying out step may be attained by validating the common reference signal and invalidating the individual reference signal, in the array mode; and by validating the individual reference signal and invalidating the common reference signal, in the individual mode.

Also, in the (c) setting step, it may be determined whether the common reference signal is supplied to each of the N transceiver blocks, and then it may be determined for each of the N transceiver blocks that the common reference signal is available, when it is determined that the common reference signal is supplied to the N transceiver block.

In addition, the (c) setting step may further include the steps of: determining whether or not the common reference signal generating section is in an operation state; and determining for each of the N transceiver blocks that the common reference signal is available, when it is determined that the common reference signal generating section is in an operation state.

DESCRIPTION OF THE PREFERRED EMBODIMENTS

Hereinafter, an array antenna transceiver of the present invention will be described below in detail with reference to the attached drawings.

Figure 1:
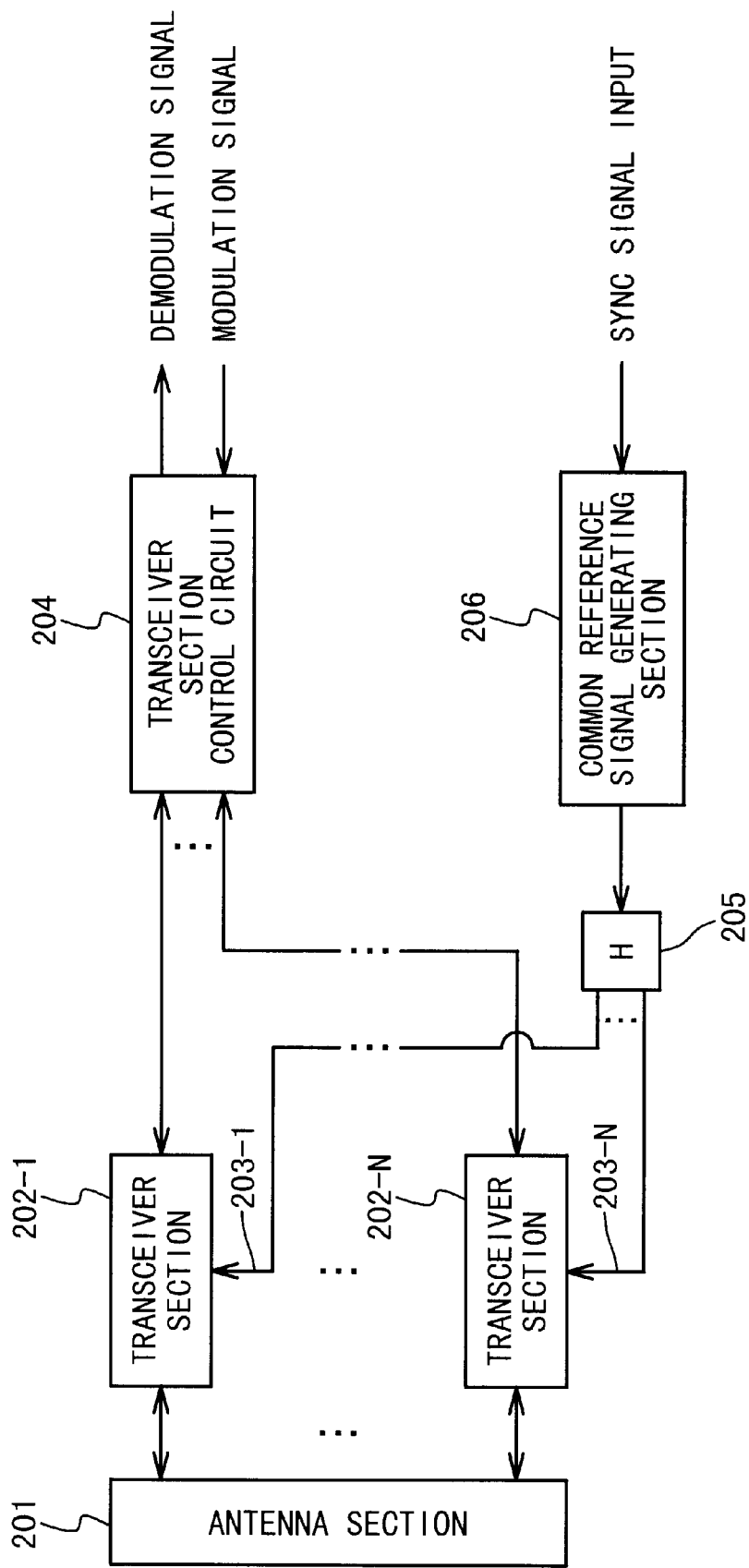
FIG. 1 is a block diagram of a conventional array antenna transceiver.
Figure 2:
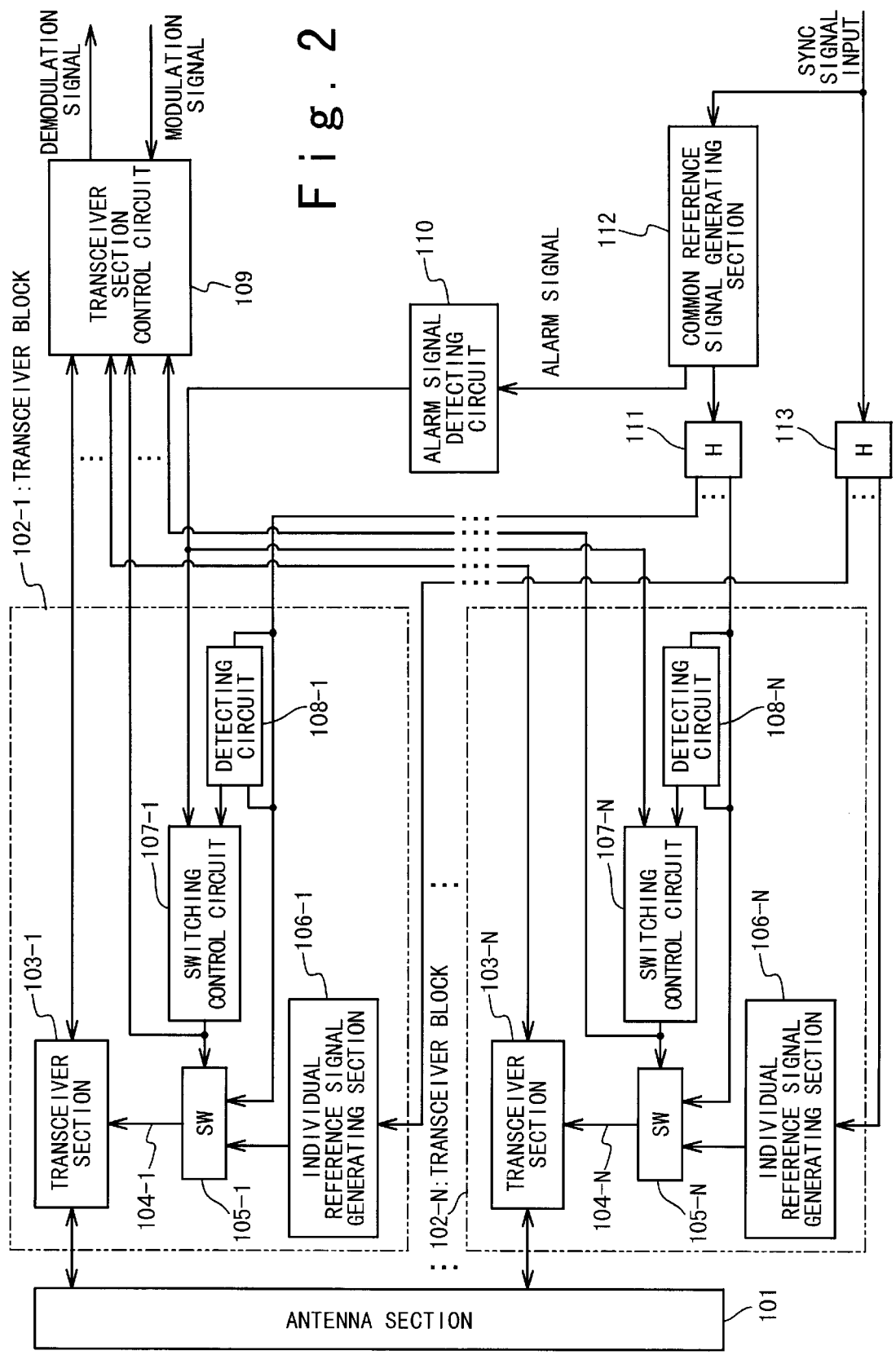
FIG. 2 is a block diagram of an array antenna transceiver according to an embodiment of the present invention.

FIG. 2 is s block diagram showing the structure of the array antenna transceiver according to the embodiment structure of the present invention. The array antenna transceiver in this embodiment has a redundant structure for a reference signal in which a system is switched to the system using an individual reference signal generating section, when a common reference signal generating section does not operate normally or the reference signal supplied from the common reference signal generating section cannot be detected.

Referring to FIG. 2, the array antenna transceiver is composed of an antenna section 101, N transceiver blocks 102-1 to 102-N, a transceiver section control circuit 109, an alarm signal detecting circuit 110, hybrid circuits (distributing circuits) 111 and 113, and a common reference signal generating section 112. Generally, transceiver blocks are provided for the number of inputs/outputs of the antenna section, and the N (N is an integer more than 1) transceiver blocks are provided in this embodiment. However, the present invention can be applied, even when the number of inputs/outputs of the antenna section or the number of transceiver block is not N.

The transceiver block 102-n can be provided for each of a plurality of antenna elements of the array antenna and carries out transmission and reception using the corresponding antenna element. The common reference signal generating section 112 generates a reference signal and outputs the reference signal as the common reference signal. The common reference signal is synchronous with a predetermined synchronization signal as a conversion signal. The common reference signal is used to carry out a converting process in which a baseband signal is taken out from a carrier frequency reception signal when each transceiver block 102-n (n=1, 2, ..., N) receives the carrier frequency reception signal from the antenna section 101, and in which a carrier frequency transmission signal is generated from a baseband signal of an information signal to be transmitted when the carrier frequency transmission signal is transmitted from the antenna section 101. Also, the common reference signal generating section 112 outputs an alarm signal indicating an abnormal state of the section 112 when the common reference signal cannot be normally generated.

The hybrid circuit 111 distributes the common reference signal from the common reference signal generating section 112 to the transceiver blocks 102-n. The hybrid circuit 113 inputs the same synchronization signal which is supplied to the common reference signal generating section 112, and supplies a synchronization signal to an individual reference signal generating section 106-n in each of the transceiver blocks 102-n.

When the common reference signal generating section 112 outputs the alarm signal, an alarm signal detecting circuit 110 detects the alarm signal, and notifies the abnormal state of the common reference signal generating section 112 to all the transceiver blocks 102-n.

The transceiver section control circuit 109 sets an array mode or an individual mode based on a switching control signal from a switching control circuit to be described later. Also, the transceiver section control circuit 109 carries out a reception process in which a weighting operation and a synthesizing operation are carried out to the baseband signals generated by the respective transceiver blocks 102-n in the array mode as an array mode process and the baseband signal in the individual mode as an individual mode process so as to output as a demodulation signal. Also, the transceiver section control circuit 109 carries out a transmission process in which a weighting operation is carried out to a modulation signal so as to generate baseband signals for respective transceiver blocks 102-n in the array mode as the array mode process and a base band signal in the individual mode as the individual mode process.

The antenna section 101 is composed of a plurality of antenna elements and has the inputs/outputs of the transmission and reception signals for the number of antenna elements. In this embodiment, the number of antenna elements, the arrangement of the antenna elements, and the structure and shape of the antenna section are not limited. Also, whether each antenna element is an antenna for transmission and reception or an antenna for transmission or reception is not specified.

The transceiver block 102-n(n=1, 2, ..., N) is composed of a transceiver section 103-n, a switch 105-n, an individual reference signal generating section 106-n, a switching control circuit 107-n, and a detecting circuit 108-n.

In this embodiment, the structure of the transceiver section 103-n is optional. The transceiver section 103-n inputs the reference signal from the common reference signal generating section 112 in an array mode or the individual reference signal from the individual reference signal generating section 106-n in an individual mode. The transceiver section 103-n converts the baseband signal into a carrier frequency signal to drive the antenna element in case of the transmission, and converts a received carrier frequency signal into a baseband signal in case of the reception.

Each of the individual reference signal generating section 106-n and the common reference signal generating section 112 contains an LO signal (local oscillation signal) generator, a sampling signal generator, and a baseband reference signal generator. The LO signal is used to convert a carrier frequency signal into an intermediate frequency signal or for the inverse conversion. The baseband reference signal is used for conversion of an intermediate frequency signal into a baseband frequency band signal or for the inverse conversion. The sampling signal gives a sampling period for A/D converting an analog baseband signal into a digital baseband signal, and for D/A converting a digital baseband signal into an analog baseband signal. In this embodiment, the waveform of the reference signal, the method of generating the reference signal and the structures of the LO signal generator, sampling signal generator, and baseband reference signal generator are optional. Also, the structure of the individual reference signal generating section and the waveform of the synchronization signal inputted to the common reference signal generating section are also optional.

The detecting circuit 108-n detects that the output signal of the hybrid circuit 111 is not normally connected with the transceiver block containing the detecting circuit. The switch 105-n receives the output of the hybrid circuit 111 and the output of the individual reference signal generating section 106-n, and connects one of them with the transceiver section 103-n through the reference signal path 104-n of based on a switching control signal.

The switching control circuit 107-n inputs the output of the alarm signal detecting circuit 110 and the output of the detecting circuit 108-n. When the alarm signal detecting circuit 110 and the detecting circuit 108-n do not detect any abnormal state of the common reference signal generating section 112, the switching control circuit 107-n generates a switching control signal to connect the output of the hybrid circuit 111 with the transceiver section 103-n, so that the transceiver section control circuit 109 sets the array mode to the transceiver block in response to the control signal. When at least one of the alarm signal detecting circuit 110 and the detecting circuit 108-n detects the abnormal state, the switching control circuit 107-n generates the switching control signal to connect the output of the individual reference signal generating section with the transceiver section 103-n, so that the transceiver section control circuit 109 sets the individual mode to the transceiver block in response to the control signal. Thus, the switching control circuit 107-n controls the switching of the switch 105-n. Also, the output of the switching control circuit 107-n is connected with the transceiver section control circuit 109. In this way, the transceiver section control circuit 109 can know which of the transceiver blocks 102-n operates based on the common reference signal at present. That is, the transceiver section control circuit 109 can know that each of the transceiver blocks 102-n is set to the array mode or the individual mode.

Next, the operation of this embodiment will be described.

In case of the reception, the common reference signal is supplied from the common reference signal generating section to the transceiver section 103-n in the normal operating state or the array mode in the array antenna transceiver. For example, when the transceiver section 103-n should carry out the frequency conversion of a reception signal in a radio band to a baseband band, the array antenna transceiver carries out the frequency conversion of the reception signal inputted from antenna section 101 to a baseband band and a sampling operation of the analog baseband signal to a digital signal and sends to the transceiver section control circuit 109. At this time, the common signal generating section 112 generates a LO signal and a sampling signal and supplies to the transceiver section. The LO signal is used in case of the frequency conversion and the sampling signal is used in case of the sampling operation. The typical transceiver section which handles such a radio reception signal is composed of a mixer, a frequency converting section which having the LO signal as an input and an analog-to-digital converter having the sampling signal as an input. There is a double heterodyne receiver in which the LO signal is supplied to the mixer in 2 stages of the first intermediate band and the second intermediate band as an example of the frequency conversion section.

Also, in case of the transmission, the reference signal is supplied from the common reference signal generating section 112 to the transceiver section 103-n in the normal operating state or the array mode in the array antenna transceiver. For example, when the transceiver section should convert a baseband signal into a transmission signal in the radio band, the array antenna transceiver section converts a digital modulation signal supplied from the transceiver section control circuit 109 into an analog signal and generates a baseband signal, and carries out the frequency conversion of the baseband signal to the radio band transmission signal to send to antenna section 101. At this time, the common reference signal generating section 112 generates and supplies the LO signal and the sampling signal to the transceiver section. The LO signal is used for the frequency conversion and the sampling signal is used to convert the digital modulation signal into the analog signal. The typical transceiver section which handles such a radio transmission signal is composed of a mixer, a frequency conversion section having the LO signal as input and the digital-to-analog converter having the sampling signal as input. As an example of the frequency conversion section, there is a double heterodyne transmitter in which the LO signal is supplied to and converted by the mixer in 2 stages of the first intermediate band and the second intermediate band.

In the present invention, the common reference signal generating section 112 and the individual reference signal generating section 106-n are used to supply the common reference signal and the individual reference signal. The switching between the common reference signal and the individual reference signal is carried out by the switch 105-n. Also, the switching of the switch 105-n is determined by the detecting circuit 108-n and the alarm signal detecting circuit 110 and the switching is automatically carried out by the switching control circuit 107-n.

The common reference signal generating section 112 is used in the array mode as the unit which supplies the reference signal. At this time, the common reference signal generating section 112 inputs a synchronization signal to generate the common reference signal. The generated common reference signal is distributed to the transceiver sections 103-1 to 103-N by the hybrid 111 through the switch 105-1 to 105-N. By this method, the reference signals for the transceiver sections 103-n are generated by the single common reference signal generating section 112. Therefore, the same reference signal is supplied to all the transceiver sections in common.

The individual reference signal generating section 106-1 to 106-N is used in the individual mode as the means of supplying the individual reference signal. At this time, the synchronization signal is distributed to the N individual reference signal generating section 106-1 to 106-N by the hybrid 113. The generated individual reference signal is supplied to the transceiver section 103-n through the switch 105-n in each transceiver block 102-n. By this method, the individual reference signal is generated by the individual reference signal generating section 106-n for every transceiver block. Therefore, the reference signal independent for every transceiver section is supplied to each transceiver section.

When the common reference signal generating section 112 is in an abnormal state so that the alarm signal is outputted from the common reference signal generating section 112, the alarm signal is detected by the alarm signal detecting circuit 110. The alarm signal detecting circuit 110 outputs an alarm signal detection signal to notify the detection of the alarm signal. The alarm signal detecting circuit 110 distributes the alarm signal detection signal to all the transceiver blocks 102-n, and supplies to the switching control circuit 107-n in each transceiver block 102-n.

On the other hand, when the detecting circuit 108-n cannot detect the common reference signal from the common reference signal generating section 112, the detecting circuit 108-n supplies the reference signal non-detection signal to the switching control circuit 107-n to notify the reference signal non-detection. When at least one of the reference signal non-detection signal and the alarm signal detection signal is supplied to the switching control circuit 107-n, the switching control circuit 107-n outputs a trigger signal to the switch 105-n, and switches the reference signal supply source from the common reference signal generating section 112 to the individual reference signal generating section 106-n.

Generally, when the array antenna transceiver operates in the array mode, the transceiver sections 103-n are supplied with the common reference signal from the common reference signal generating section 112. However, when the alarm signal detecting circuit 110 detects the alarm signal or when the detecting circuit 108-n outputs the reference signal non-detection signal, the switching of the signal source of the reference signal is carried out as follows. When the common reference signal generating section 112 outputs the alarm signal, the switching is carried out in all the transceiver sections 103-1 to 103-N and the individual reference signals are supplied from the individual reference signal generating sections 106-1 to 106-N to the transceiver sections 103-1 to 103-N, respectively. When the detecting circuit 108-n cannot detect the common reference signal from the common reference signal generating section 112, the switching is carried out individually for the transceiver section 103-n to be supplied with the common reference signal, the individual reference signal is supplied from the individual reference signal generating section 106-n to the transceiver section 103-n.

The alarm signal is outputted when the common reference signal generating section 112 falls in a non-operating state because of any trouble or causes an abnormal state such as a step out from frequency of the reference signal. On the other hand, the detecting circuit 108-n outputs the signal to notify the reference signal non-detection, when the reference signal cannot be detected because of any break of a signal line from the common reference signal generating section 112 to the transceiver section 103-n.

One of the of the N transceiver blocks 102-1 to 102-N in which the individual reference signal is supplied from the individual reference signal generating section 106-n carries out transmission and reception independently for every antenna element. The transceiver block in which the common reference signal is supplied from the common reference signal generating section 112 operates to carry out transmission and reception using the array antenna. The trigger signal outputted from the switching control circuit 107-n to the switch 105-n is distributed to the transceiver section control circuit 109. Thus, whether the antenna elements should carry out transmission and reception as the array antenna or the antenna element carries out transmission and reception for every element is informed from the switching control circuit 107-n to the transceiver section control circuit 109. Thus, the transceiver section control circuit 109 sets the array mode or individual mode. The transceiver section control circuit 109 controls each of the transceiver sections 103-n to carry out transmission and reception independently for every antenna element in the individual mode or as the array antenna in the array mode in accordance with the trigger signal outputted from the switching control circuit 107-n. The transceiver section control circuit 109 outputs a demodulation signal in case of the reception and inputs a modulation signal in case of the transmission. It should be noted that there is no limitation to the structure of the transceiver section control circuit 109 and the method of the independent control of the transmission and reception for every antenna element or as the array antenna.

In the embodiment of the present invention, in FIG. 2, the switching is determined using both of the detecting circuit 108-n and the alarm signal detecting circuit 110. However, the present invention can be attained using either one of them.

In the conventional array antenna transceiver, when the common reference signal generating section goes to the non-operating state because of any trouble, it is necessary that the signal transmission and reception are stopped to replace the common reference signal generating section for restoration. According to the present invention, the reference signal can continue to be supplied by switching from the individual reference signal generating section even in case of such a non-operation as the common reference signal generating section stops the operation. Thus, the transmission and reception are carried out for every antenna element so that the transmission and reception can be continued.

What is claimed is:

1. An array antenna transceiver comprising:
    an antenna section having antenna elements;
    N (N is an integer more than 1) transceiver blocks connected to said antenna elements, wherein each of said N transceiver blocks generates an individual reference signal and carries out transmission of a transmission signal and reception of a reception signal based on an common reference signal using a corresponding antenna element as a part of an array antenna in an array mode and based on said individual reference signal using said corresponding antenna element as an individual antenna element in an individual mode;
    a common reference signal generating section which supplies said common reference signal to said N transceiver blocks; and
    a transceiver control section which sets said array mode when said common reference signal is used, and said individual mode when said individual reference signal is used.

2. The array antenna transceiver according to claim 1, wherein each of said N transceiver blocks comprising an individual reference signal generating section which generates said individual reference signal.

3. The array antenna transceiver according to claim 1, wherein each of said N transceiver blocks comprises:
- a transceiver section which carries out the transmission of said transmission signal and the reception of said reception signal using said corresponding antenna element as the part of said array antenna in said array mode based on said common reference signal and using said corresponding antenna element as the individual antenna element in said individual mode based on said individual reference signal;
- a switch;
- a switching control circuit which controls said switch to supply said common reference signal to said transceiver section, when said common reference signal is supplied to said transceiver block, and controls said switch to supply said individual reference signal to said transceiver section, when said common reference signal is not supplied to said transceiver block.

4. The array antenna transceiver according to claim 3, wherein each of said N transceiver blocks comprises:
- a detecting circuit which determines whether said common reference signal is supplied to said transceiver block.

5. The array antenna transceiver according to claim 3, wherein said switching control circuit controls said switch to supply said common reference signal to said transceiver section, when said common reference signal is supplied to said transceiver block, and controls said switch to supply said individual reference signal to said transceiver section, when said common reference signal is not supplied to said transceiver block or when said common reference signal generating section is not in an operation state.

6. The array antenna transceiver according to claim 5, further comprising an alarm detecting circuit which determines whether or not said common reference signal generating section is in the operation state.

7. A method of ensuring continuity of transmission and reception in an array antenna transceiver, comprising the steps of:
- (a) generating a common reference signal normally by a common reference signal generating circuit;
- (b) generating an individual reference signal;
- (c) setting each of N transceiver blocks connected to antenna elements to one of an array mode and an individual mode based on whether said common reference signal is available;
- (d) carrying out one of an array mode process and an individual mode process to a transmission signal and a reception signal to and from each of said N transceiver blocks based on whether said transceiver block is set to said array mode or said individual mode; and
- (e) carrying out transmission of said transmission signal and reception of said reception signal using the corresponding antenna element as a part of an array antenna in said array mode and using said corresponding antenna element as an individual antenna element in said individual mode.

8. The method according to claim 7, wherein said (c) setting step comprises the steps of:
- (f) setting each of N transceiver blocks to said array mode when said common reference signal is available, and to said individual mode when said common reference signal is not available.

9. The method according to claim 7, wherein said (e) carrying out step comprises the steps of:
- (g) validating said common reference signal and invalidating said individual reference signal, in said array mode; and
- (h) validating said individual reference signal and invalidating said common reference signal, in said individual mode.

10. The method according to claim 7, wherein said (c) setting step comprises the steps of:
- (i) determining whether said common reference signal is supplied to each of said N transceiver blocks; and
- (j) determining for each of said N transceiver blocks that said common reference signal is available, when it is determined that said common reference signal is supplied to said N transceiver block.

11. The method according to claim 10, wherein said (c) setting step further comprises the steps of:
- determining whether or not said common reference signal generating section is in an operation state; and
- (j) determining for each of said N transceiver blocks that said common reference signal is available, when it is determined that said common reference signal generating section is in an operation state.

* * * * *